Jan. 5, 1960 D. L. NETTLETON ET AL 2,920,313

INFORMATION HANDLING DEVICE

Filed Sept. 23, 1955 5 Sheets-Sheet 1

INVENTORS.
David L. Nettleton &
Lowell S. Bensky
BY Morris A. Rabkin
ATTORNEY.

Jan. 5, 1960 D. L. NETTLETON ET AL 2,920,313

INFORMATION HANDLING DEVICE

Filed Sept. 23, 1955 5 Sheets-Sheet 2

INVENTORS.
David L. Nettleton &
Lowell S. Bensky
BY Morris L. Rabkin
ATTORNEY.

INFORMATION HANDLING DEVICE

Filed Sept. 23, 1955 5 Sheets-Sheet 3

INVENTORS.
David L. Nettleton &
Lowell S. Bensky
BY Morris A. Rabkin
ATTORNEY.

INVENTORS.
David L. Nettleton &
Lowell S. Bensky
BY Morris Rabkin
ATTORNEY.

INVENTORS.
David L. Nettleton &
Lowell S. Bensky.
BY Morris A. Rabkin
ATTORNEY.

United States Patent Office 2,920,313

Patented Jan. 5, 1960

2,920,313

INFORMATION HANDLING DEVICE

David L. Nettleton, Haddonfield, N.J., and Lowell S. Bensky, Levittown, Pa., assignors to Radio Corporation of America, a corporation of Delaware Application September 23, 1955, Serial No. 536,199

18 Claims. (Cl. 340—174)

*Table of contents*

1.0 Introduction
2.0 Detailed description
  2.1 Description of circuits—preliminary
  2.2 Description of circuits of Figure 1
  2.3 Description of circuits of Figure 2
  2.4 Description of circuits of Figure 3
  2.5 Description of circuits of Figure 4
  2.6 Description of circuits of Figure 5
3.0 Machine operation
  3.1 Staticizing instructions E
    3.1.1 Status level R001 high
    3.1.2 Status level R002 high
    3.1.3 Status level R003 high
    3.1.4 Summary
  3.2 Performing operation E
    3.2.1 Status level RS high
    3.2.2 Status level RIS high
    3.2.3 RS–RIS sequence
    3.2.4 Status level RI high
    3.2.5 Status level RO high
    3.2.6 RIS–RI–RO sequence
    3.2.7 Effect of ISS
    3.2.8 Illustrative sequence of status levels
4.0 Conclusion

1.0 *Introduction*

The present invention relates to information handling devices, and particularly to a method and system for rearranging stored information.

A computer is one example of an information handling device which employs an internal memory. Information is applied to the computer through an input. A program control unit of the computer controls the flow of information between the input, the internal memory, other units of the computer, such as an arithmetic unit, and the computer output. This information may be in the form of characters, each character comprising a group of coded binary electrical signals. An item (sometimes called a word) may be made up of a group of successive characters. A message may include a group of items.

To afford adequate storage of the large amounts of information often encountered in modern electronic computers, a serial form of external memory is often employed. The information from the serial memory is applied to the input of the computer. For example, magnetic tape or paper tape are often used as an external serial storage means for the storage of a large bulk of information which is to be applied to the computer.

The internal memory of the computer is preferably operable at a high speed and, although the memory may be cyclical, it is preferably of the random access type, so that the flow of information may be handled at high speed in response to the program control unit. Thus, in performing an operation, an excessive wait for access to information in a cyclic memory is avoided.

It is often desirable to rearrange information stored in such a high speed internal memory. One such rearrangement is that of justifying an item. Justifying involves shifting certain characters of an item, having allotted to it certain addresses in the memory to either of the extreme allotted addresses (e.g. the lowest or highest addresses). Right justification, for example, involves the shifting of all one kind of characters (e.g. all characters other than space symbols) of an item to the least significant ones of the item's allocated memory locations (or other locations). The operation justify-right is usually employed prior to reading numbers out to tape or preparatory to printing an output in numbers so that the numbers will be lined up on the right hand side of a column.

Accordingly, it is an object of this invention to provide a system and method of justifying items of variable non-standard maximum word lengths.

Another object of the present invention is to provide a simple and rapid system and method for justifying right maximum length items at random storage locations.

Still another object of this invention is to provide an information handling device having an internal memory with a system for justifying to the right information stored in the memory.

A further object of the invention is to provide an information handling device which permits right hand justification of variable length items.

An additional object of this invention is to provide an information handling device which permits the transferring sequentially to the right, of one kind of characters, such as non-space characters, with respect to a preselected memory position.

In accordance with the invention, instructions are stored in a memory section, which may be a portion of the internal memory of an information handling device, for example a computer. Means are provided for withdrawing these instructions from their locations in the memory section. One or more of these instructions may direct performance of the operation justify right. During this operation, the several individual storage locations for an item are sequentially examined for one kind of characters (all other than space symbols). One counter is advanced each time an examination is made. A second counter is advanced each time a non-space character is recognized. The first counter is utilized to address each successive storage location to be examined. By using the second counter to address and re-enter the recognized non-space characters, respectively, into the memory an item is justified to the right.

The provision of means to justify right is especially useful in a computer of the type handling variable length items. This is true because the operation requires only a single examination of each item regardless of length. The time required to perform the justification is, of course, dependent on the length of the item alone.

The novel features of this invention as well as the invention itself, both as to its organization and method of operation, will best be understood from the following description, when read in connection with the accompanying drawings, in which like reference numerals refer to like parts, and in which:

Figures 1 to 5 inclusive constitute a schematic diagram with the components in block form of so much of a computer embodying the invention to provide a clear understanding of the invention itself;

2.0 *Detailed description*

2.1 *Description of circuits—preliminary*

Figures 1, 7:
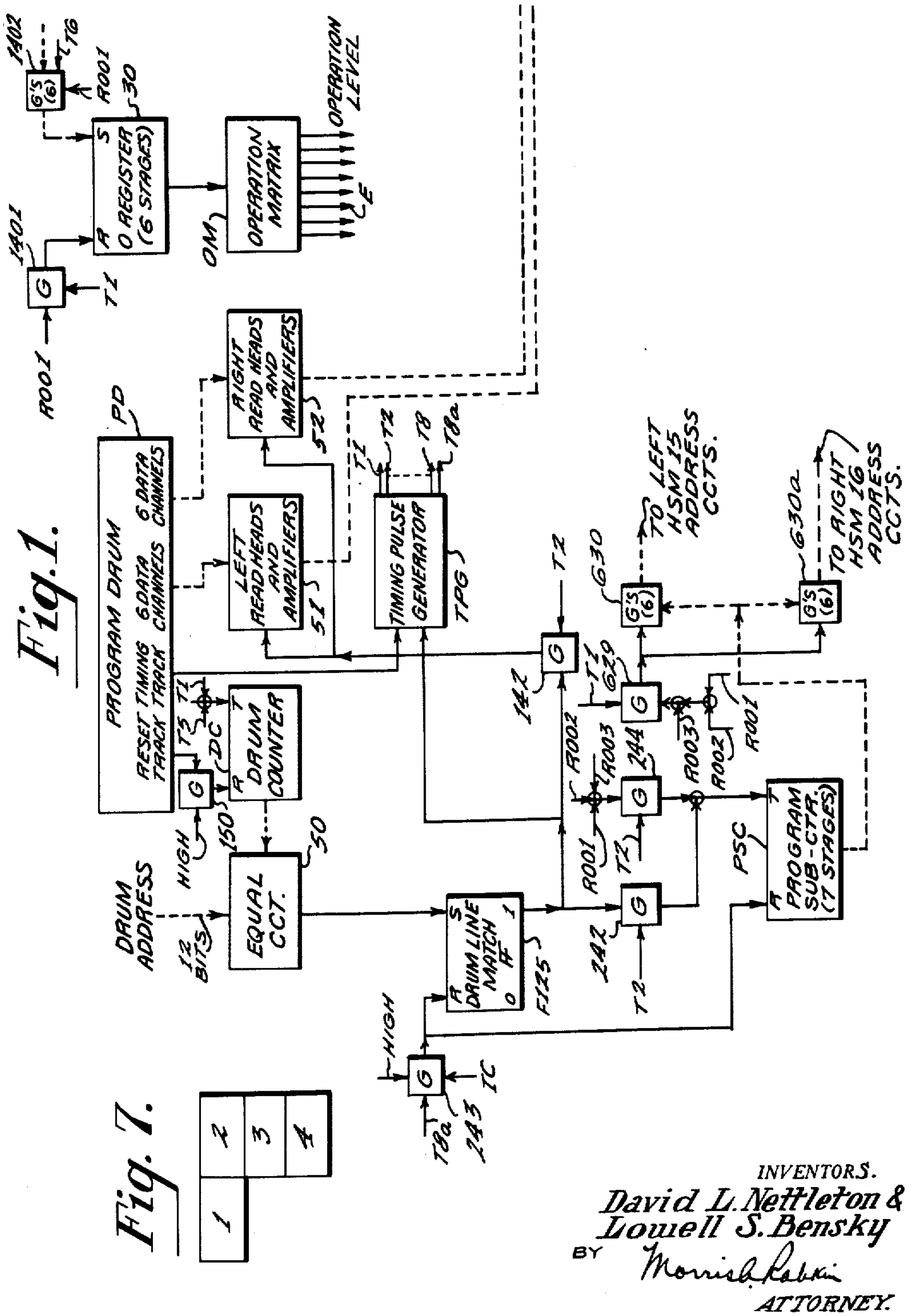
Figure 7 is a layout illustrating the manner in which Figures 1 to 4 inclusive are to be arranged with respect to one another.

The present invention is embodied in a computer which is more fully described in a copending application entitled, "Information Handling System" by one of the applicants, Lowell S. Bensky, Serial No. 478,021, filed December 28, 1954. It may be noted that the various components bear similar designations and the same reference numerals as the similar components in the drawings in the said Bensky application. The said Bensky application describes the computer in detail, including various operations among which are an operation for reading in from tape to the computer and one for justifying to the right a number stored in the memory. The latter operation is involved here. The computer is shown in the present application in abbreviated form, including only so much as provides a clear and ready understanding of this invention.

Figure 3:
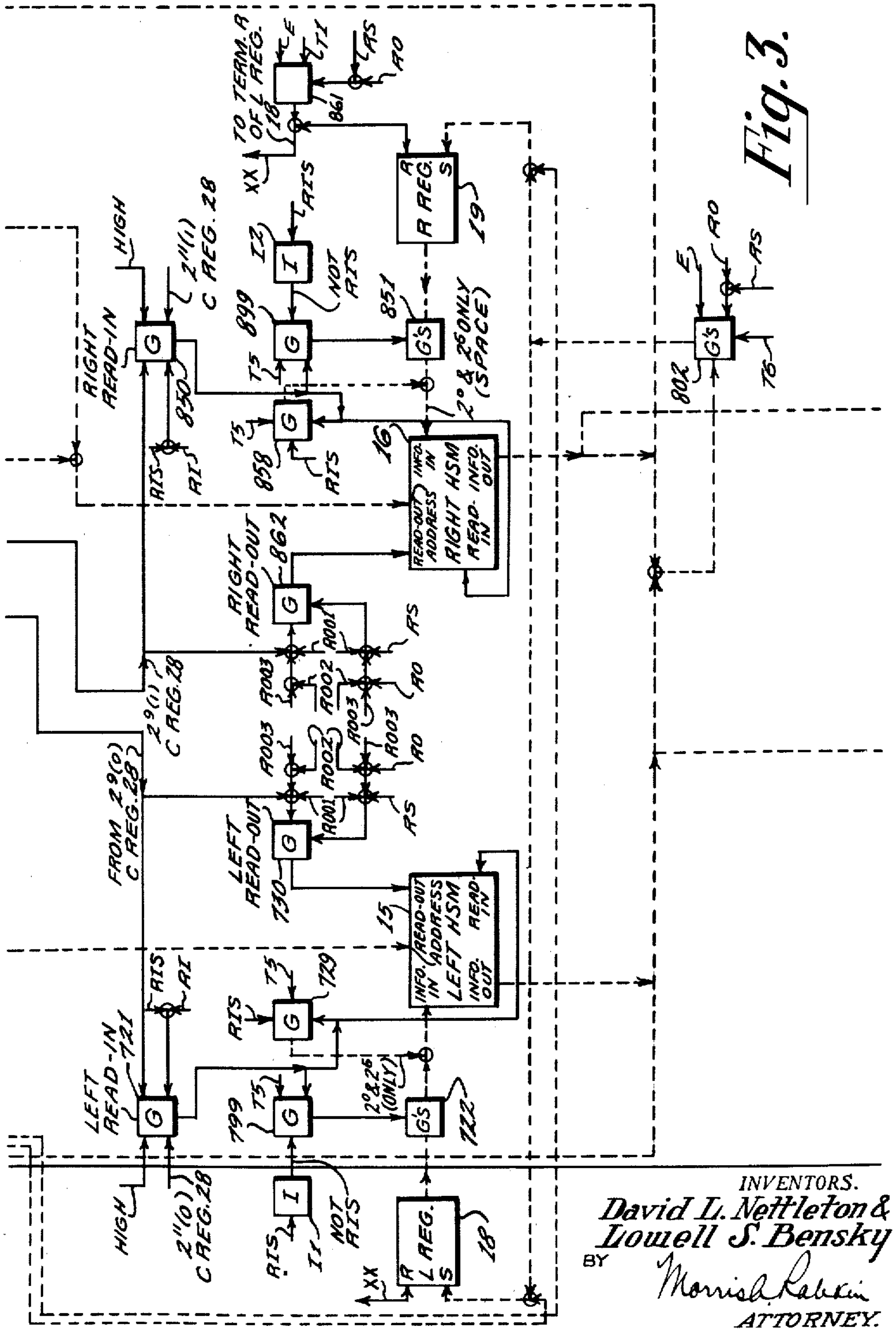

The data upon which this computer acts may be stored in a static memory which, by way of example, may comprise two banks designated, respectively, the left high speed memory 15 and the right high speed memory 16 (see Fig. 3). Hereafter, the abbreviation HSM is employed for the high speed memory. Each memory bank may be of the type employing magnetic cores and may be assumed to include address circuits. Each memory bank also includes read-out and write-in circuits which may be respectively actuated by pulses or high levels.

Upon the occurrence of a pulse at the appropriate circuit, the memory is placed in condition to read in information applied to its information-in circuits or to read out information to its information-out circuits. The information in or out is in the form of binary digits of information, or bits, as represented by an electrical signal (a voltage level) on one of several leads. Seven bits in this instance may be stored at each address and written-in or read-out in parallel. However, one of these seven bits is a parity bit and is ignored in describing the present invention. As will appear more fully hereinafter, a series of timing (that is, clock) pulses are provided in cycles of approximately 20 microseconds. It is assumed that the read-in and read-out circuits, although actuated for addressing the location of the information, are further actuated internally only upon the occurrence of a timing pulse designated T5. Information may be received from or fed out of the memory throughout the period from timing pulses T5 to timing pulses T6. In the alternative, a vacuum tube type memory, such as a selectron or any other suitable type of random access memory, may be employed.

It may be noted that the employment of two banks of the memory, and the use of other certain details involved, are not essential to the invention described and claimed herein, but these details are shown and described by way of clear, explicit, and full example.

Preferably, provision is made for surging instructions (operation plus addresses) into the memory section of a computer from a cyclic storage means, such as a magnetic program drum of the computer. Thus, the operator can enter the preselected instruction on the drum, when ready to start the program. The instructions are then surged into that portion of the memory section that serves as a surge tank, for example, in the manner described in the patent to Bensky et al., 2,679,638. The instructions may be withdrawn one at a time on recognition of a special symbol, and the item, at the selected address contained in the instruction, justified to the right with respect to the specified address. On the occurrence of the next special symbol, an instruction is withdrawn from the succeeding storage location in the memory section, and the item following this second symbol at the new address is justified to the right. Accordingly, justification of variable non-standard maximum item lengths may be performed by a single examination of each item. No additional storage capacity in the internal memory is required.

2.2 *Description of the circuits of Figure 1*

In a known manner, a program drum PD (Fig. 1) is supplied with a timing track and a reset track. The program drum PD is preferably a magnetic coated drum continuously rotated. As the drum rotates, pulses from the timing track are generated in reading heads positioned adjacent the timing track. The pulses are in synchronism with lines of informtion written on the drum in the form of binary numbers magnetically stored in twelve data channels. With the occurrence of every other pulse from the timing track, a timing pulse generator TPG generates a series of nine timing pulses designated as T1 to T8, and T8*a*, respectively. The particular manner of generation of timing pulses is shown more fully in the said copending Bensky application, and especially the manner whereby every alternate pulse from the timing track is suppressed. This latter feature, although highly useful in providing greater compression of information on the drum, requires no further description for the purposes of describing the present invention. The reset track on the program drum PD provides a fiducial pulse from which the lines on the drum are counted.

Six of the data channels on the program drum PD are read by six left reading heads and amplifiers 51, and the other six data channels are read by six right reading heads and amplifiers 52. A gate 150 receives the pulses from the reset track of the program drum PD and applies it to the reset terminal R of a drum counter DC. The gates herein are all logical "and" gates, and are indicated by rectangles with the priming leads indicated by arrows directed toward the rectangle and the output by an arrow leaving the rectangle. The gate 150 is a two-input "and" gate. In addition to the input from the reset track, another input to the gate 150 is indicated which, for the purposes of the present application, may be considered always high (having a high voltage level), and the gate therefore always open. The drum counter may be a counter of twelve stages.

Each of the counters and registers herein may be flip-flop counters or registers. The trigger terminal T of the drum counter DC receives the output of an "or" circuit. This "or" circuit receives two inputs, one, the first timing pulse T1, and the other, the fifth timing pulse T5. In the drawing of this application, as in the Bensky application, a special convention is adopted for the showing of an "or" circuit. According to this convention, the inputs to the "or" circuits are indicated by arrow heads converging to a point which is the center of a small circle.

A drum address is provided containing twelve bits of address information. This input is merely indicated by the letters DRUM ADDRESS since this particular function is not deemed essential for the purposes of describing the present invention. This drum address may, for example, be provided by a counter or a register having twelve flip-flop stages, such as is described in the above mentioned Bensky application. The twelve bits of address information from the drum address are applied to twelve inputs of an equal circuit 50. Another twelve inputs to the equal circuit 50 are from the twelve flip-flop stages of the drum counter DC.

A flip-flop is a circuit having two stable states, that is, conditions, and two input terminals, one of which may be designated "reset," and the other "set." The flip-flop may assume the set condition by application of a high level (or pulse) on the set input terminal S, or the reset condition by application of a high level (or pulse) on a reset terminal R. Two outputs are associated with the flip-flop circuit, which are given the Boolean tags of "one" and "zero." If the flip-flop is in its set condition (that is, set) the "one" output voltage is high and the "zero" output voltage is low. Unless otherwise indicated, the outputs from flip-flops are taken from the "one" terminal. If the flip-flop is reset (that is, in its reset condition) the "one" terminal is low and the "zero" terminal is high. A flip-flop may also be provided with a trigger terminal T. Application of pulses to the trigger terminal T causes the flip-flop to assume the other condition from the one it was in when the pulse was applied. Counters are formed from flip-flops in a known manner.

In this application, multiple leads are indicated by dotted lines. Each of these multiple leads carries, as the machine operates, a binary digit of information having only two possible voltage levels, one high and one low. Therefore, the lines themselves are sometimes designated as bits (binary digits of information).

The equal circuit 50 may comprise a group of "and" gates, one for each pair of output leads from the corresponding bits of input information from the drum address and the drum counter. The outputs of each of the twelve "and" gates are then applied to a single "and" gate. Accordingly, the equal circuit 50 has a pulse output if, and only if, the binary number of the address is the same as the binary number in the drum counter DC.

A drum line match flip-flop F125 receives at its set terminal S the output of the equal circuit 50. Note that the stylized double F is employed in the drawing to indicate a flip-flop. The output of a three input gate 243 is coupled to the reset input of the drum line match flip-flop F125. Inputs to the three input "and" gate 243 are received from the eighth delayed timing pulse T8*a*, from the status level IC (Fig. 5), and from a third input lead, herein designated by the symbol HIGH. The high designation is given since, throughout the justify-right operation, which is the subject of this invention, a high input voltage level is maintained at that particular input.

Several status levels, such as IC, above, are provided, only one of which is high at any given time. The selection and provision of the various status levels will be described in greater detail hereinafter in connection with Fig. 5. For the present, it is sufficient to note that among the status levels provided in the interest of the present application are those designated as follows: R001, R002, R003, RIS, RI, RO, RS, and IC.

The "one" output from the drum line match flip-flop F125 is applied to a gate 142, to a gate 242, and to the timing pulse generator TPG. In this application, a junction between leads is indicated by an arrow head at the junction, which indicates the direction of signal or information flow. Each of the gates 142 and 242 is a two-input gate and receives as its second input, the second timing pulse T2. It may be noted that the gates 142 and 242 provide the same output and their function could be combined in one gate. Such a combination could also be made in other instances contained herein. The output of the gate 142 is applied to both the left and right reading heads and amplifiers 51 and 52 and may be considered to control, or gate, the outputs of the reading heads and amplifiers. The output of the gate 242 is coupled through an "or" circuit to the trigger input terminal T of a seven stage counter, designated as the program sub-counter PSC. A two-input "and" gate 244 also has its output coupled through the last mentioned "or" gate to the trigger input terminal T of the program sub-counter PSC. This latter gate 244 receives, as one input, the second timing pulse T2. The second input is provided by the output of a three-input "or" gate, the three inputs of which are R001, R002, and R003. The reset input to the program sub-counter PSC is provided by the three-input "and" gate 243. The program sub-counter PSC is reset simultaneously with the drum line match flip-flop F125.

Figures 5, 6:
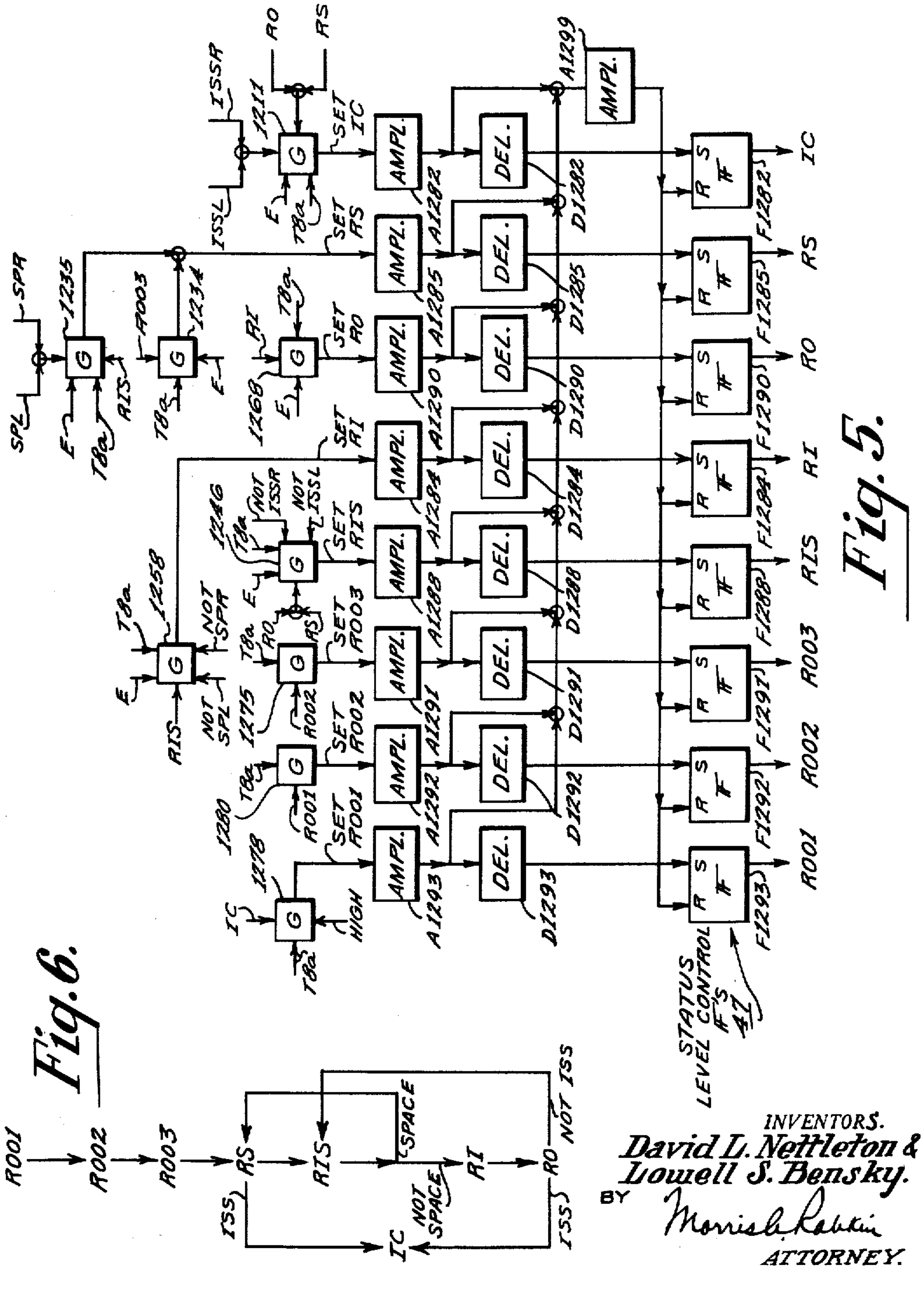
Figure 6 is a flow diagram of certain high status levels required to perform the operation justify right (a level being one of two bi-valued voltages at a particular output)

A first set of six two-input "and" gates 630 are provided and a second set of six two-input "and" gates 630*a* are provided. Each gate of each of the sets of gates 630 and 630*a* receives one input from the output of a two-input "and" gate 629. Each of the gates 630 also receives a second input from a respective one of six of the seven outputs of the program sub-counter PSC (the seventh output, the parity bit, is ignored for purposes of this disclosure as mentioned above). Also each of the six gates 630*a* receives one input from a different output of the seven stages of the program sub-counter PSC. Note, that between the gates 630 and 630*a*, the output leads from the program sub-counter PSC are indicated as branched, a similar convention being employed for multiple leads as shown here. One input to the gate 629 is provided by the first timing pulse T1. The remaining input to the gate 629 is provided by the output of an "or" circuit, the inputs to which are the status levels R001, R002, and R003 (Fig. 5). The outputs of each of the six gates 630 are coupled to the address circuits of the left HSM15 (Fig. 3) which will be described in conjunction with Fig. 3. Similarly, each of the six leads from the output of the gate 630*a* are coupled to the address circuits of the right HSM16 (Fig. 3). This also will be described in conjunction with Fig. 3.

A "0" register 30 of six stages is utilized. The different outputs of the "0" register are connected to control an operation matrix OM. The reset terminals R of the "0" register 30 receive the output of a two-input "and" gate 1401. One input to the gate 1401 is from the status level R001, and the other input is from the first timing pulse T1. The set terminals S of the "0" register 30 receive the various outputs of a set of six gates 1402, each of which is a three-input "and" gate. One input to each of the gates 1402 is provided by the status level R001, and a second input to each of the gates 1402 is provided by the sixth timing pulse T6. The third input to each of the gates 1402 is received from one of the six output leads of the left HSM15. The operation matrix OM is a matrix which selects a different output lead depending on the six bits entered into the "0" register 30. The particular output of the operation matrix of interest in the present application is indicated as an operation level E. The other outputs of the operation matrix OM are of interest with respect to other operations which the entire computer may perform. The operation matrix therefore selects the operation to be performed by the computer in response to a coded input from the "0" register 30 which input may be withdrawn from either the left or right HSM15, 16 as described hereinafter.

Figure 2:
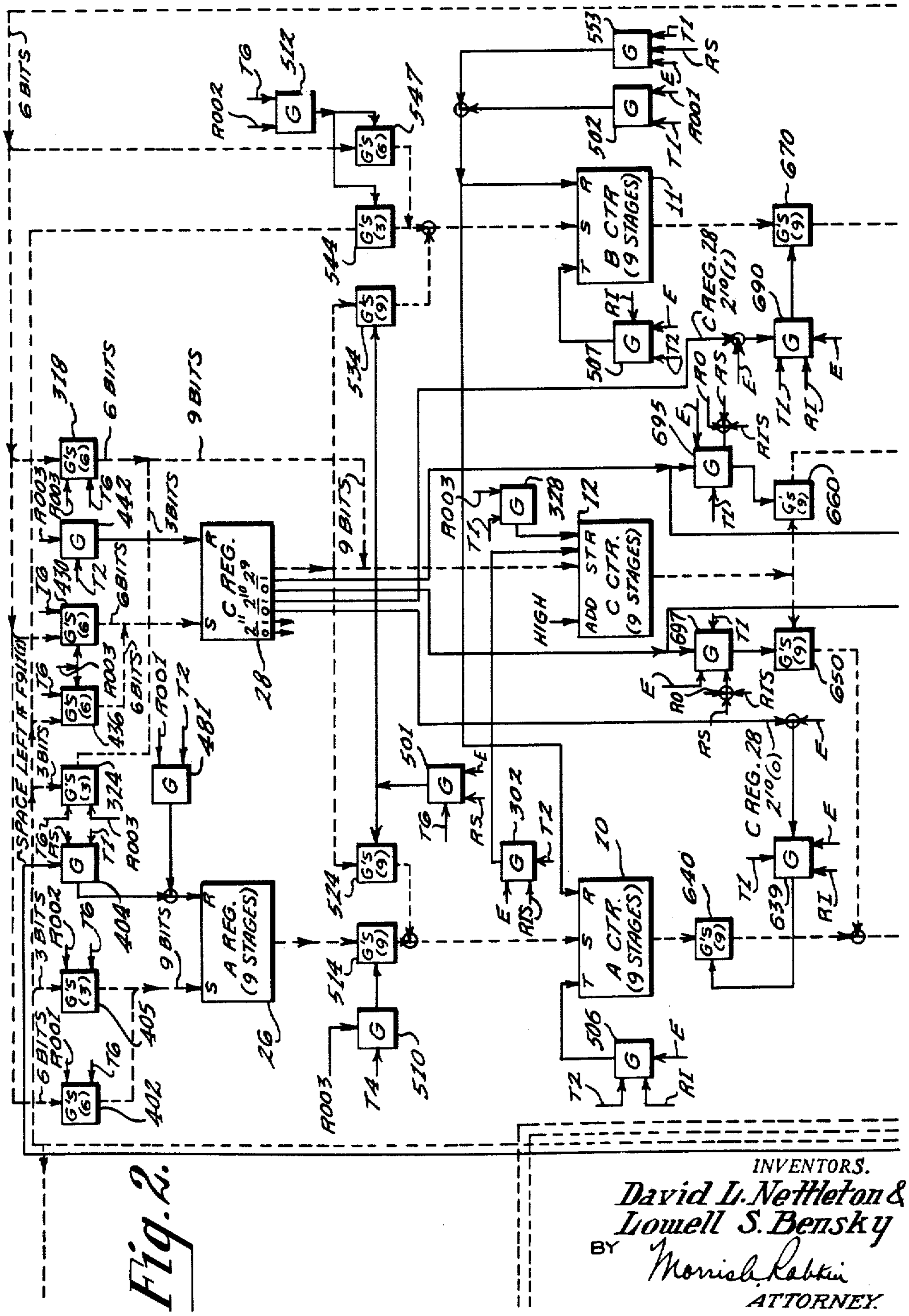

2.3 *Description of the Circuit of Figure 2*

Reference is made to Figure 2 which is to be placed immediately to the right of and adjacent to Figure 1 as is indicated by the block drawing of Figure 7. With this particular layout the lines from Figure 1 to Figure 2 are continuous.

Figure 4:
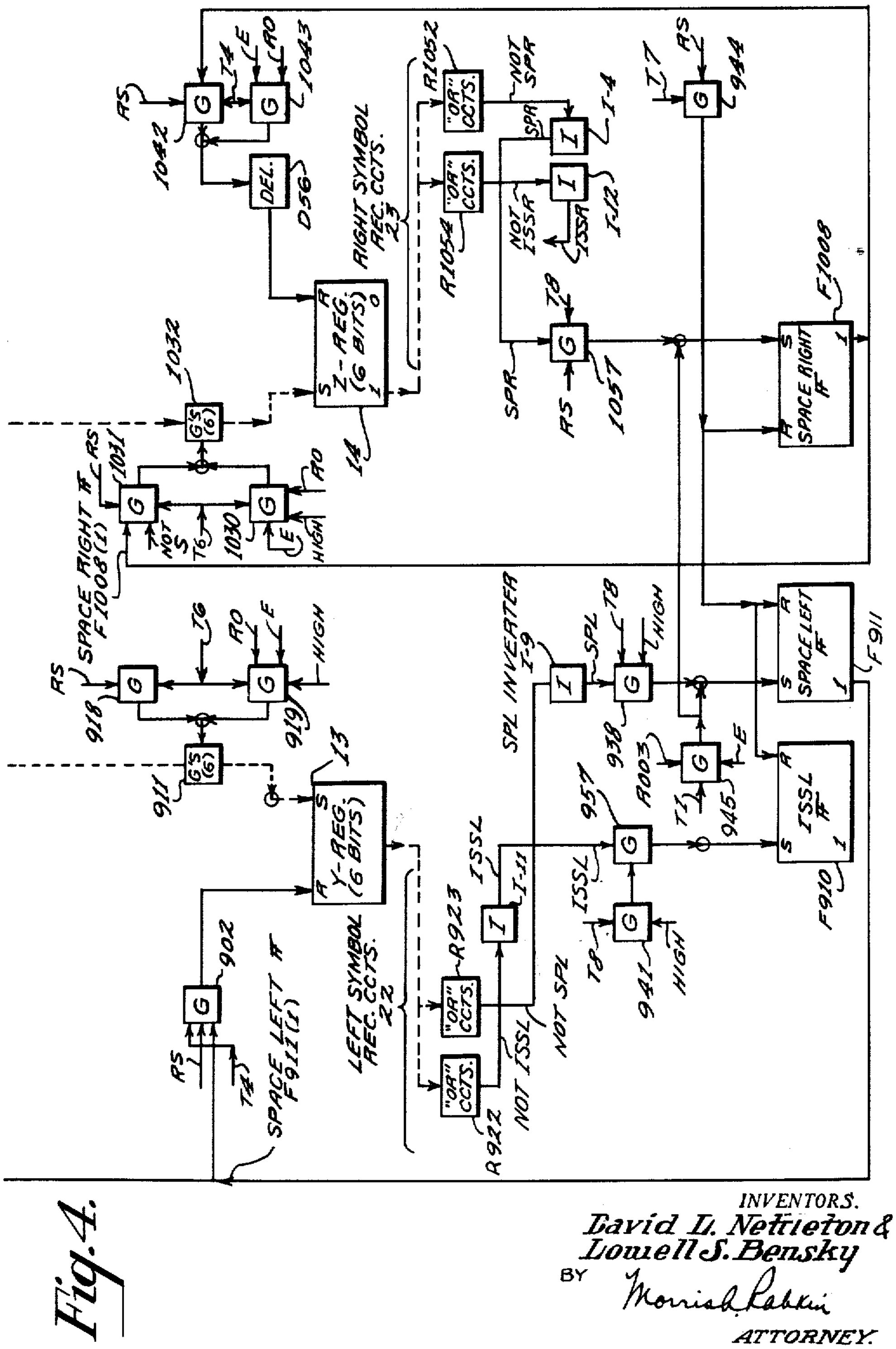

The reset terminals R of a nine stage A register 26 receive the output of a two-input "and" gate 481 through an "or" gate arrangement. One input to the two-input "and" gate 481 is the status level R001 and the other input to the two-input "and" gate 481 is the second timing pulse T2. Six of the set terminals of the A register 26 receive the outputs of a set of six three-input gates 402. One input of each of the gates 402 is from the status level R001 and a second input is the sixth timing pulse T6. The third input to each of the six gates 402 is from the six respective outputs from the right HSM16 (Figure 3). The other three terminals S of the A register 26 receive, respectively, the outputs of a set of three three-input "and" gates 405. One of the inputs to the gates 405 is the status level R002 and a second input to each of the gates 405 is the sixth timing pulse T6. The remaining (third) input to the gates 405 is, respectively, from three of the six bits of output of the left HSM15. Also connected into the reset input of the A register, through the "or" gate arrangement is a three-input "and" gate 404. The first input to the "and" gate 404 is provided by the first timing pulse T1 and a second input by the status level RS. The third-input to the three input "and" gate 404 is received from the "one" output of a space left flip-flop F911 (Figure 4).

The remaining three bits of the output from the left HSM15 (Fig. 3) are applied, respectively, to the three gates of a set of three two-input gates 544. Three of the set terminals S of a nine stage B counter 11, respectively, receive the three outputs of the gates 544. The set terminal S of the other six lowest order stages of the B counter 11 receive, respectively, the six outputs of a set of six two-input gates 547. Gates 547 receive one input, respectively, from each of the six outputs of the right HSM16 (Fig. 3). The second input to each of the gates 544, and to each of the gates 547, is from the output to the two-input "and" gate 512. One input to the gate 512 is from the status level R002 and the other input to the two-input "and" gate 512 is from the sixth timing pulse T6.

A twelve stage C register 28 and a nine stage C counter 12 are provided. The six lowest order stages of the C counter 12 have their respectvie set terminals S connected to receive the outputs of a set of six two input "and" gates 318. The set terminals S of the six lowest order stages of the C register 28 are connected to receive the outputs of a set of six three-input "and" gates 430. Each gate of the sets of gates 318 and 430 receives as one input the status level R003, and as a second input the sixth timing pulse T6. Further, each gate of both of the sets of six gates 318 and 430, respectively, receive, as their respective third input, the six outputs of the right HSM16.

The remaining three set terminals S of the C counter 12 are connected, respectively, to receive the outputs of a set of three three-input "and" gates 324. The gates 324 have as one input the status level R003, and as a second input the sixth timing pulse T6. In this instance, the third input to each of the gates 324 is from the respective three lowest order outputs of the left HSM15 (Fig. 3). These three outputs of the left HSM15 are also applied to three gates of a set of six three-input "and" gates 436. The remaining three outputs of the left HSM15 are applied to the other three gates of the six gates 436 and these latter three gates have their output terminals connected, respectively, to the set terminals S of the three highest order stages ($2^9$, $2^{10}$, and $2^{11}$) of the C register 28. The other three outputs of the set of six gates 436 are connected to the remaining set terminals S respectively of the remaining three stages of the C register 28. The remaining two inputs to each of the gates 436 are respectively the status level R003 and the sixth timing pulse T6.

Although the outputs from the memory banks are apparently read into many places at once, the fact is these outputs are distributed during the different status levels. However, note, for example, that the entry to the nine lowest order stages of the C register 28 is the same and made at the same time as that to the nine stages of the C counter 12 and from the same memory outputs.

The reset terminals R of the C register 28 receive the output of a two-input "and" gate 442. The two inputs to the "and" gate 442 are provided by the second timing pulse T2 and the status level R003. The reset terminals R of the B counter 11 are connected to receive the output of an "or" gate. This "or" gate receives the inputs from either of two gates 502 and 553. The first of these gates, namely, gate 502, is a two-input gate receiving inputs from the first timing pulse T1 and the status level R001. The other of these gates, namely gate 553, is a three-input "and" gate receiving inputs from the operation level E, the status level RS, and the first timing pulse T1. The output of this "or" gate which supplies the reset terminal R of the B counter 11 is also coupled to the reset terminals of a nine stage A counter 10.

The reset terminals R of the C counter 12 are connected to receive the output of a two-input "and" gate 328 having as one of its inputs the status level R003, and the second of its inputs the first timing pulse T1. As described more fully in the said copending Bensky application, the C counter 12 is a true counter made up of flip-flops, and is reversible. However, for the purposes of the present application, it may be assumed that the C counter 12 is always in its additive state and counts up. Thus the input to the add portion of the C counter is merely indicated by a high level input. In this manner, as will be later described more fully, the C counter counts upward from the least significant digit address of the item being justified during the justify right operation. The trigger input to the C counter 12 is provided by a three-input "and" gate 302. These three inputs to the gate 302 are received, respectively, from the operation level justify right, the status level RIS (read in space), and the second timing pulse T2.

The nine bit outputs from the A register 26 are each connected to one of the inputs of a set of nine two-input "and" gates 514. The remaining input to each of the two-input "and" gates 514 is provided by the output of a two-input "and" gate 510. The two inputs to the "and" gate 510 are, respectively, the status level R003 and the fourth timing pulse T4. The nine low order bits from the C register 28 are applied to each respective gate of two sets of nine two-input "and" gates 524, and 534, respectively. The remaining input to each of these two sets of nine two-input "and" gates 524 and 534, respectively, is provided from the output of a three-input "and" gate 501. The three inputs to the gate 501 are received from the operation level E, the status level RS, and the sixth timing pulse T6.

The outputs of the set of nine gates 534 are connected through an "or" gate, with the outputs of the gates 544 and 547, to the set inputs of the B counter 11. Similarly, the output of the gates 524 is connected through an "or" gate, with the output from the gates 514, to the set inputs of the A counter 10. The trigger terminals T of the A counter 10 receive inputs from a three-input "and" gate 506. This latter gate 506 receives inputs from the operation level E, from the status level RI, and from the second timing pulse T2. Similarly, the trigger inputs to the B counter 11 are provided by a three-input "and" gate 507. The first of these inputs to the "and" gate 507 is provided by the operation level E. The remaining two inputs to the gate 507 are received from the status level RI, and the second timing pulse T2. The outputs from the A counter 10 provide the inputs, respectively, to each of nine sets of two-input "and" gates 640. The remaining input to each set of the two input gates 640 is received from a four input gate 639. One of the inputs to the gate 639 is provided by the output of an "or" gate having inputs from the operation level E and from the "zero" output of the $2^{10}$ bit of the C register 28. The remaining three inputs to the gate 639 are provided by the operation level E, status level RI, and the first timing pulse T1.

In a similar manner, the nine bit outputs from the B counter 11 provide inputs to nine sets of two-input "and" gates 670. The remaining input to each of these "and" gates 670 is received from a four-input "and" gate 690. One of the inputs to the gate 690 is from the output of an "or" gate having inputs either from the operation level E or from the "one" output of the $2^{10}$ bit of the C register 28. The operation level E, the status level RI, and the first timing pulse T1 provide the remaining inputs to the gate 690. The nine bit output from the C counter 12 provides inputs to each of nine sets of two-input gates 650 and to each of nine sets of two-input gates 660, respectively. A priming signal for each one of the set of gates 660 is received from a four-input gate 695. One of the inputs to the gate 695 receives the output of an "or" gate having inputs from the RIS, the RS, and the RO status levels. Another of the inputs to the gate 695 is received from the "one" output of the $2^9$ bit of the C register 28. The remaining inputs to the gate 695 are received from the first timing pulse T1 and the operation level E. In a similar manner, each of the nine sets of two-input "and" gates 650 is primed by the output of a gate 697. As in the case of the gate 695, the gate 697 receives one input from the output of an "or" circuit having inputs from the RO, the RS, and the RIS status levels. The "zero" output of the $2^9$ bit of the C register 28 provides another of the inputs to the "and" gate 697. The first timing pulse T1 and the operation level E furnish the remaining inputs to the gate 697. The output of each of the sets of gates 640 and each of the sets of gates 650 are connected together through an "or" gate to address input of the left HSM 15 (Fig. 3). Similarly, the outputs of each of the sets of gates 660 and of each of the sets of gates 670 are connected through an "or" gate to the address input of the right HSM 16 (Fig. 3).

2.4 *Description of the circuits of Figure 3*

Reference is made to Figure 3 which is to be placed immediately below Figure 2, as indicated by Figure 7, so that the lines from the Figure 2 to the Figure 3 are continuous. In Figure 3, portions on the left-hand side and on the right-hand side of the figure are nearly symmetrical, that is, the circuits are similar and perform similar functions. Therefore, only the left-hand portion of the figure is described in detail and the corresponding parts, together with the differences in connections, will be pointed out as the description progresses.

The left HSM15 receives, as inputs to its address circuits, as described above, nine outputs of either of the two sets of two-input gates 640 or 650 (Fig. 2), through "or" circuits. Additional inputs to the "or" circuits and thus to the left circuit HSM15 (Fig. 3) are respectively from the gates 630 (Fig. 1).

A six bit input to the left HSM15 information-in circuits (abbreviated in the drawing as INFO. IN) is received from the six outputs of two sets of gates 722 and 729. One input to each of the gates 722 is from the output of a three input gate 799. One input of the gate 799 is from the output of an inverter circuit I1 having an input provided by the RIS status level. The output of this inverter I1 thus provides a logical not RIS high level input signal to the gate 799. A second input to the gate 799 is provided by the fifth timing pulse T5. The third input to the gate 799 is from the output of a left read-in gate 721. The output of the left read-in gate 721 is also applied to prime the read-in circuits of the left HSM15. One input of the gate 721 may be taken as always high, for the purpose of the present application so that the gate 721 may be considered as always primed thereby. A second input to the left read-in gate 721 is taken from the "zero" output of the $2^{11}$ bit of the C register 28 (Fig. 2). The third input of the left read-in gate 721 is from the "zero" output of the $2^9$ bit of the C register 28 (Fig. 2). The fourth (and final) input to the left read-in gate 721 is from the output of "or" circuits having inputs from the RIS and RI status levels.

Each of the gates 722 receive their second inputs, respectively, from the six outputs of a left register 18, termed the L register 18. The six outputs of the six left reading heads 51 (Fig. 1) are applied through "or" circuits to the six set terminals S, respectively, of the L register 18 (Fig. 3). Additional inputs to the set terminals S of the L register 18 are received from the output of a set of six gates 802. One of the inputs to each of the gates 802 receives the output of an "or" circuit having inputs from the RO and RS status levels, respectively. Two other of the inputs to each of the respective gates 802 are provided by the sixth timing pulse T6 and the operation level E. Each of the respective gates 802 receive the fourth (and final) input from the output of a set of six "or" circuits. These last mentioned "or" circuits receive the respective six outputs from the information output (info out) terminals of the left and right HSM15 and 16, respectively.

The $2^0$ and $2^6$ bits, respectively, of the information-in circuits of the left HSM15 also receive inputs through "or" circuits from the outputs of a set of three-input gates 729. The gates 729 serve to introduce the coding of a "one" in the $2^0$ and $2^6$ bit, representing a space character, into the left HSM15. Inputs to the gates 729 are received from the output of the gate 721, from the fifth timing pulse 75, and from the RIS status level.

The (read-out) circuits of the left HSM15 are actuated by the output of a left read-out gate 730. The left read-out gate 730 is activated by two inputs from the outputs of two "or" circuits, respectively. The first of these "or" circuits receives inputs from the status levels R001 and RS. The remaining input to this last mentioned "or" circuit is provided by the output of a second "or" circuit receiving inputs from either of the status levels R002, R003, or RO. The remaining input to the left read-out gate 730 is also received from the output of an "or" circuit, one input of which is provided by the status level R001. An additional input to this last mentioned "or" circuit is from the "zero" output of the $2^9$ bit of the C register 28 (Fig. 2). The remaining input to this last mentioned input is received from the output of an additional "or" circuit receiving inputs from the status levels R002 and R003. By way of summary, the left read-out gate 730 has a "high" output whenever any one of the status levels R001, R002, and R003 is high.

The components of the right hand portion of Figure 3 corresponding to those of the left hand portions are as follows: The right HSM16 corresponds to the left HSM15; the right register 19 corresponds to the left register 18. However, the set terminals S of the R register 19 receive the outputs of the right reading heads 52 (Fig. 1); the gates 851 correspond to the gates 722; the gate 899 corresponds to the gate 799. The right read-in gate 850 corresponds to the left read-in gate 721. However, the gate 850 receives an output from the "one" terminal rather than the "zero" terminal of the $2^{11}$ and $2^9$ bit flip-flops of the C register 28 (Fig 2); and the gate 858 corresponds to the gate 729.

It should be noted, at this point, that the set inputs to the left and right registers 18 and 19, respectively, receive inputs from the outputs of the gates 630 and 630*a* (and thus from the information output from the left and right reading heads and amplifiers 51 and 52) (Fig. 1), respectively, as well as from the output of the gate 802. In addition, a three input gate 861 is provided having an output which is applied to the reset terminals R of both the L register 18 and the R register 19. This last mentioned output is designated as XX. The gate 861 has its first input from the output of an "or" circuit receiving inputs from the RO and RS status levels. A second input to the gate 861 is provided by the first timing pulse T1. The third input to the gate 861 is received from the operation level E. The right read-out gate 862 corresponds to the left read-out gate 730 to provide an output whenever any one of the status levels R001, R002, or R003 is high.

2.5 *Description of the circuits of Figure 4*

Reference is made to Figure 4 which is to be placed immediately below Figure 3, as is indicated in Figure 7, so that the lines from one figure to the other are continuous.

In the description of this figure, as in the description of Figure 3, since the left and right halves of the figure are very nearly symmetrical, a description will be given only of the left side. Then, comments will be made as to the similarities or changes necessary in the right side of the Figure 4.

A Y register 13 of six stages is provided. The set input terminals S of the Y register receive the output from the left HSM15 through a set of six two-input "and" gates 911. The "or" gates shown in Figure 4 between the output of the "and" gates 11 and the set input S of the Y register 13 do not contribute to an understanding of the present invention, and their function need not, therefore, be explained here. Similarly, certain other "or" gates, the purpose of which are not explained, may appear elsewhere in the drawing. The remaining input to each of the "and" gates 911 is provided by the output of an "or" circuit having inputs from the output of two gates 918 and 919, respectively. The gate 918 receives an input from the sixth timing pulse T6 and from the status level RS. The gate 919 receives inputs from the RO status level, from the E operation level, and from the sixth timing pulse T6. A fourth input to the gate 919, for the purposes of this application, may be considered as always having a high level, or condition.

The output of a three input gate 902 is coupled to the reset inputs of each of the six stages of the Y register 13. The first input to the gate 902 is provided by the fourth timing pulse T4. A second input to the gate 902 is received from the status level RS. The third (and final) input to the gate 902 is provided by the output of the space left flip-flop F911. The outputs of each of the six stages of the Y register 13 are coupled to the left symbol recognition circuits 22.

These symbol recognition circuits 22 comprise two "or" circuits R922 and R923. Each of the "or" circuits R922 and R923 receives a different one of the six outputs from each of the six stages of the Y register 13. The first of the "or" circuits R922 recognizes the absence of an item separator symbol in the Y register. Thus, the output of the gate R922 is termed NOT ISSL. This NOT ISSL output is connected to the input of an inverter I11. Due to the functioning of the inverter I11, its output indicates the presence of an item separator symbol in the Y register. Thus, the output of the inverter I11 is termed ISSL and provides a high level signal when an item separator symbol is received in the Y register from the left HSM15 (Fig. 3). Accordingly this ISSL output lead is high, if, and only if, the input to the recognized NOT ISSL gate R922 receives a coded item separation symbol. Continuing, the ISSL output is applied to a two-input gate 957. The second input to the gate 957 is provided by the output of a gate 941. One input to the gate 941 is provided by the eighth timing pulse T8. For the purposes of this application, the remaining input to the gate 941 may be considered to have a continuous high level input. The output of gate 957 is connected to the set inputs of the ISSL flip-flop F910.

Symbol recognition circuits contained in the "or" circuits R923 are termed the space recognition circuits. The logic herein utilized is again an inverted type logic. These logical "or" circuits are arranged so that an output is provided, if, and only if, their inputs from the Y register 13 is not a coded space symbol. This NOT SPL lead is applied to an inverter I9 and the output of the inverter is designated SPL. Accordingly, the SPL output lead is high, if, and only if, the input to the recognized NOT SPL circuit (that is, the output of the Y register 13) is a coded space symbol. The SPL output of the inverter 19 is supplied to one input of a three-input gate 938. The second input to the gate 938 is provided by the eighth timing pulse T8. The third input to the gate 938 may, for the purposes of this application, be considered to be always high. The output of the gate 938 is connected through an "or" circuit to the set inputs of the space left flip-flop F911.

The components of the right hand portion of Figure 4 corresponding to those of the left hand portion are as follows: Z register 14 corresponds to the Y register 13; gates 1032 correspond to the gates 911; gates 1030 and 1031 correspond to the gates 919 and 918, respectively; the gate 1042 corersponds to the gate 902. In this instance, the output of the gate 1042 is connected to an "or" circuit along with another gate 1043. The output of the "or" circuit is connected through a delay line D56 to the reset input R of the Z register 14. The gate 1043 is a three-input gate, the first input of which is provided by the fourth timing pulse T4. The remaining two inputs to the gate 1043 are received from the operation level E and the status level RO. Further, the gate 1031, whose output is directed through an "or" gate to an input of the gates 1032, is a four-input "and" gates, the first input of which is provided by the sixth timing pulse T6, and a second input by the status level RS. A third input to the gate 1031, indicated in Figure 4 as "Not S," for the purposes of this application may be considered as always having a high level, or condition. The fourth input to the gate 1031 is derived from the "one" terminal of the space right flip-flop F1008.

The right symbol recognition circuits 23 correspond to the left symbol recognition circuits 22. Within the right symbol recognition circuits 23 the "or" circuits R1054 and R1052, respectively, correspond to the "or" circuits R922 and R923, respectively. Likewise, the respective inverters I12 and I4 correspond to the inverters I11 and I9, respectively. It should be pointed out, however, that the output of the inverter I4, from which the SPR signal is derived, is applied to the input of a three-input "and" gate 1057. The second input to the gate 1057 is received from the status level RS, and a third input to this gate is received from the eighth timing pulse T8. The output of the gate 1057 is connected through an "or" circuit to the set inputs of a space right flip-flop F1008. Also connected to this latter mentioned "or" circuit is a three-input "and" gate 945. The output of the gate 945, in addition to being coupled through an "or" circuit to the set inputs of a space right flip-flop F1008, is also connected through an "or" circuit along with the output of a gate 938 to the set inputs of the space left flip-flop F911. The first input to the gate 945 is provided by the operation E. A second input to the gate 945 is provided by the first timing pulse T1, and the third input to this gate is provided by the status level R003.

Note that there is no ISSR flip-flop corresponding to the ISSL flip-flop F910. A two-input gate 944 is provided, receiving inputs from the seventh timing pulse T7 and the status level RS. The output of the gate 944 is connected to the reset inputs, respectively, of the ISSL flip-flop F910, the space left flip-flop F911, and the space right flip-flop F1008.

2.6 *Description of the circuits of Figure 5*

With reference to Figure 5, the eight status levels concerned with the present operation of justifying to the right a stored item, or an item stored in the HSM, are indicated as R001, R002, R003, RIS, RI, RO, RS, and IC. These eight leads are, respectively, the "one" output terminals of a set of flip-flops F1293, F1292, F1291, F1288, F1284, F1290, F1285, and F1282 which are designated as the status level control flip-flops 47. These status levels, or leads, are not carried continuously to the other figures, but are indicated throughout by their appropriate reference letters.

The set terminals S of the status level control flip-flop 47 are connected to receive, respectively, as itemized above, the outputs of the delay circuits D1293, D1292, D1291, D1288, D1284, D1290, D1285 and D1282. The inputs of these delay circuits are connected to receive the outputs, respectively, of amplifiers A1293, A1292, A1291, A1288, R1284, A1290, A1285 and A1282. The inputs to these amplifiers last mentioned are designated, respectively, as "set R001" lead, the "set R002" lead, the "set R003" lead, "set RIS" lead, "set RI" lead, "set RO" lead, "set RS" lead, and "set IC" lead. The outputs of the amplifiers A1293, A1292, A1291, A1288, A1284, A1290, A1285, and A1282 are applied through a series of "or" circuits to an amplifier A1299, the output of which is applied to reset terminals R of the various status level control flip-flops 47. Each of the "set" leads is activated by recognition circuits. Thus, a three-input "and" gate 1278 is provided having its output applied to the set R001 lead. One input to the gate 1278 is from the status level IC. The status level IC is assumed high upon the completion of the last instruction, before the current instruction for the operation E is to be withdrawn. The same occurs at the end of the operation E, as will be subsequently described. The second input to the gate 1278 may, for the purposes of this application, be considered to be always high. The third input to the gate 1278 is from the eighth delayed timing pulse T8*a*.

A two-input "and" gate 1280 has one input from a status level R001, and has a second input from the eighth delayed timing pulse T8*a*. The output of the gate 1280 is applied to the set R002 lead.

A two input "and" gate 1275 receives one input from the status level R002 and receives a second input from the eighth delayed timing pulse T8*a*. The output of the gate 1275 is applied to the set R003 lead.

A five-input "and" gate 1246 is provided having an output applied to the set RIS lead. The first input to the gate 1246 is provided by the output of an "or" circuit receiving inputs from the RO and RS status levels. A second input to the gate 1246 has an input from the operation level E. The third input to the gate 1246 is from the eighth delayed timing pulse T8*a*. Finally, the fourth and fifth inputs to the gate 1246 are provided by the NOT ISSR and NOT ISSL outputs, respectively.

A five-input "and" gate 1258 is provided having an output applied to the set RI lead. First and second inputs to the gate 1258 are supplied by the NOT SPL and NOT SPR leads, respectively. Remaining inputs to the gate 1258 are received from the RIS status level, the E operation level, and the eighth delayed timing pulse T8*a*, respectively.

A three-input "and" gate 1268 is provided having an output to the set RO lead. The inputs to the gate 1268 are, respectively, from the operation level E, the status level RI, and the eighth delayed timing pulse T8*a*. Two "and" gates 1234 and 1235 are coupled through an "or" gate to the set RS lead. The first gate 1234 of these two gates is a three input. The first input is provided by the operation level E. The second and third inputs, respectively, are provided by the R003 and the eighth delayed timing pulse T8a. The remaining gate 1235 of the two gates is a four input gate receiving three of its inputs from the eighth delayed timing pulse T8*a*, the operation level E, and the status level RIS. The remaining input to the gate 1235, provided by the output of an "or" gate, receive outputs from the SPL and SPR symbol recognition circuits.

A four-input "and" gate 1211 provides an output to the set IC lead. The first two of these inputs to the gate 1211 are provided by the operation level E and the eighth delayed timing pulse T8*a*. The third input to the gate 1211 is provided by the output of an "or" circuit receiving inputs from the ISSL and ISSR symbol recognition circuits. The final input to the gate 1211 is provided by the RS and RI status level coupled through an "or" gate.

3. *Machine operation*

3.1 *Staticizing instruction*

In the machine wherein this invention may find use the instructions are stored in a surge tank section of the HSM15, 16, as described for example in a patent to Bensky et al., 2,679,268. It may be assumed that the proceeding instructions withdrawn from the HSM15, 16 has been performed by the machine and that the current instruction to justify-right (operation E) is now to be withdrawn from the surge tank. Note that the status level IC is presumed to be high, along with another input (herein labeled high) to the status transition gate 1278 (Fig. 5). Therefore, the gate 1278 passes the eighth delayed timing pulse T8*a* to the set R001 lead. The pulse, thus passed, is amplified by the amplifiers A1293 and A1299. The pulse passed by the amplifier A1299 resets all of the status level control flip-flops 47. After a delay by the circuit D1293, the pulse from the amplifier A1293 sets the status level R001 is high.

3.1.1 *Status level R001 high*

T1

The gate 502 (Fig. 2) passes the first timing pulse T1 to reset the A and B counters 10 and 11. Simultaneously therewith, the gate 629 (Fig. 1) passes the first timing pulse to prime gates 630 and 630*a* (Fig.1). Gates 630 and 630*a*, thus primed, address the left and right HSM15, 16, respectively, (Fig. 3) at (000) the location of the fourteen most significant bits of the first instruction. Also, gate 1401 (Fig. 1) passes the first timing pulse T1 thereby resetting the 0 register 30 (Fig. 1). The program sub-counter PSC (Fig. 1) may be assumed to have a count corresponding to an address in the surge tank section of the memory corresponding to the instruction (to perform operation E, justify-right) about to be read out.

T2

During the second timing pulse T2, the gate 244 (Fig. 1) increases the count of the program sub-counter PSC by one. The second timing pulse T2 is also passed through the gate 481 (Fig. 2) to reset the A register 26.

T5—T6

The left and right read out gates 730 and 862 (Fig. 3) have high outputs, because of the high status level R001, to activate the read out circuits of the left and right HSM15, 16. The information stored in the left HSM15 and the right HSM16 now becomes available during the fifth and sixth timing pulses T5 and T6 from the location addressed during the immediately preceeding first timing pulse T1. The six bits from the output of the left HSM15 (Fig. 3) are now passed through the gates 1402 to the "0" register 30 (Fig. 1). Simultaneously, the sixth timing pulse T6 opens the gate 402 (Fig. 2) whereupon the six bits from the right HSM16 (Fig. 3) are passed to the six highest order stages of the A register 26 (Fig. 2). When the "0" register 30 (Fig. 1) receives the six bits applied to it, which are here assumed to be coded for the operation matrix OM to select the operation level E, the operation level E is selected and becomes high, all other operation levels remaining low.

T8*a*

The status transition gate 1280 (Fig. 5) passes the eighth delay timing pulse T8*a* to the set R002 lead. In a manner similar to that of which the R001 was selected to be high, the status level R002 is selected to be high. Because of the similarity in the manner in which the different status levels are selected, i.e., passing of the eighth delayed pulse T8*a* to an appropriate set lead, followed by resetting all the status level control flip-flops 47, and thereafter applying the delayed pulse from the appropriate set lead to the appropriate one of the status levels control flip-flops 47 to set a selected flip-flop and cause the selected status level to be high, no further description of this selection is believed necessary. Further, it is believed unnecessary to describe in detail the selection of the other status levels. The status level R002 is now high.

3.1.2 *Status level R002 high*

During R002, the second third of the instruction is transferred from the HSM to the several registers.

T1

The gates 630 and 630*a* are again opened by the first timing pulse T1 passed through the gate 629. The address circuits of the left and right HSM15, 16 (Fig. 3) are now opened and addressed by the program sub-counter PSC through the gates 630 and 630*a*.

T2

The count of the program sub-counter (Fig. 1) is advanced one, as before. The program sub-counter PSC now holds the address in the HSM location of the last third of the first instruction.

T5—T6

The read-out circuits of the left and right HSM15, 16 (Fig. 3) are activated by the left and right read-out gates 730 and 862 (Fig. 3), as previously described. At the sixth timing pulse T6, the gates 405 (Fig. 2) are opened to fill the remaining three low order bits of the A register 26 from the left HSM15 output. At the same time, the gate 512 (Fig. 2) passes the sixth timing pulse T6 to open the gates 544 (Fig. 2), thereby passing the other three bits from the left HSM15 (Fig. 3) into the B counter 11 (Fig. 2), and six bits from the right HSM16 (Fig. 3) through the gates 547 (Fig. 2) and into the B counter 11. Note, that in this instance, the B counter acts as a register.

T8*a*

Status transition gate 1275 (Fig.5) passes the eighth delayed timing pulse T8*a* to cause the status level R003 to be high.

3.1.3 *Status level R003 high*

During status level R003, the final third of the instruction is transferred from the HSM into the several registers.

T1

As in R001 and R002, the gate 629 (Fig. 1) primes the gates 630 and 630*a*, thus addressing the HSM at the address previously set into the program sub-counter PSC.

T2

The count of the program sub-counter PSC (Fig. 1) is advanced one, as before. The gate 442 (Fig. 2) passes the second timing pulse T2 to reset the C register 28 (Fig. 2).

T4

The contents of the A register 26 (Fig. 2) are transferred, through gates 544, to the A counter 10 (Fig. 2). Gate 510 passes the fourth timing pulse T4 to open the gates 514.

T5—T6

The read-out gates 730 and 862 (Fig. 3) are opened and their outputs have a high level, thereby activating the read-out circuits of the left and right HSM15, 16 (Fig. 3), as occurred in the preceding status levels R001 and R002. The six bits from the left HSM15 pass through the gates 436 and are entered into the six higher order stages of the C register 28 (Fig. 2). At the same time, the three lowest order of these six bits also pass through gate 324 (Fig. 2) and are entered in the three higher order stages of the C counter 12. Simultaneously, the six bits from the right HSM16 pass through the gates 430 (Fig. 2), primed during the sixth timing pulse T6, into the six lowest order stages of the C register 28. At the same time, the same six bits from the right HSM16 (Fig. 3) pass through the gates 318 to the six lowest order stages of the C counter 12. Accordingly, the twelve bits, six from the left HSM15 and six from the right HSM16, are now entered in the C register 28 and the nine lowest order of these bits are also entered in the C counter 12.

By way of information, the three highest order bits $2^9$, $2^{10}$, and $2^{11}$ are entered in the C register 28 from the left HSM15 for certain further usages which will be described in more detail below. For the present, suffice it to say that the $2^9$ bit is utilized to indicate which HSM, the left or the right, is to be addressed for the location of the result. The $2^{11}$ ("one" bit) is to be used to prevent reading into the HSM in certain operations, such as justify-right.

T8*a*

Upon the advent of the eighth delayed timing pulse T8*a*, the status transition gate 1234 (Fig. 5) now passes the eighth delayed timing pulse T8*a* to select the status level RS.

3.1.4 *Summary of the status levels*

Staticizing the instruction refers to the sequence of events in which the instruction is taken from the HSM and placed in a group of flip-flop registers and counters. From the registers and counters it is then possible to set up conditions for an operation to address the HSM at the location of the data that is required to perform the operation and to address the HSM at the location where the answer, if any, is to be stored. The instruction has been stored in the HSM during a previous surge of instructions from the program drum in the surge tanks in both halves of the HSM. Therefore, three status levels are required to extract the instruction from the HSM. The status levels that will be activated at the staticizing of an instruction are termed R001, R002, and R003. This sequence may be observed with reference to Figure 6. One-third of the instruction is staticized during each of these levels.

In R001, a portion of the first third of the instruction is stored in the "0" register 30 (Fig. 1) from which the operation, to be performed, is selected. In addition, a portion of the first third of the instruction is stored in the A register (Fig. 2).

During R002, the second third of the instruction is staticized. Thus the storage in the A register is completed and storage in the B counter 11 is performed. Next, in R003, the last third of the instruction is staticized in the C register 28. Simultaneously, the least significant nine bits of this group transferred to the C register 28 are transferred to the C counter 12. Also during R003, the contents of the A register 26 are transferred to the A counter 10. Particular usage of the instruction, as staticized, will be illustrated in the succeeding section 3.2.

3.2 *Performing operation E—operation level high*

In the operation justify-right, an item, having allotted to it certain addresses in the memory, is re-entered in the memory with its least significant digit as the lowest allotted address. In English writing, the positioning of the least significant numeral at the right of a column may be termed "justifying" or lining up the figures on the right hand margin of a column. By analogy, the corresponding operation of the machine is termed "justify-right." The operation is usually employed prior to reading numbers out to tape or preparatory to printing an output in numbers, so that the numbers will be "lined up" on the right hand side. In the computer, wherein this operation may be utilized, it is contemplated that this operation is to be used for numeric items.

The instruction is staticized during the status levels R001, R002, and R003 as usual. The instruction is staticized as follows:

| FFR-0 | A-Counter | B-Counter | C-Counter |
|---|---|---|---|
| "Justify Right" Instruction Code No. | Not Used. | Not Used. | Location of least-sig. char. of item after justification is complete. |

During the status level R003 high, when the instruction is staticized, the status transition gate 1234 passes the eighth delayed timing pulse T8*a* to cause the status level RS to be high.

3.2.1 *Status level RS high*

If the item to be justified is in the left HSM15, the $2^9$ bit flip-flop of the C register 28 is in its reset condition; if the item to be justified is in the right HSM16, the $2^9$ bit flip-flop of the C register 28 is in its set condition. In the former case, the gates 650 (Fig. 2) are opened by the first timing pulse T1 passed through the gate 697, and the left HSM15 (Fig. 3) is addressed by the contents of the C counter 12 (Fig. 2). In the latter case, the gates 660 are opened by the first timing pulse T1 passed through the gate 695, and the right HSM16 (Fig. 3) is addressed by the contents of the C counter 12 (Fig. 2). The L and R registers 18 and 19 (Fig. 3) are cleared (reset) by a pulse from the gate 861 (Fig. 3) during T1. The gate 553 passes the first timing pulse T1 to the reset inputs of the A counter 10 (Fig. 2) and B counter 11 (Fig. 2), thereby resetting each of these counters preparatory to succeeding operation.

Note that gate 945 (Fig. 4) passed the first timing pulse T1 in the preceding R003 cycle to set the space-left flip-flop F911 and also to set the space-right flip-flop F1008 (Fig. 4). The gate 902 (Fig. 4), primed by the "one" output terminal of the space-left flip-flop F911 (Fig. 4), passes the fourth timing pulse T4 to reset the Y register 13. The gate 1042 (Fig. 4), primed by the high "one" output terminal of the space-right flip-flop F1008, passes the fourth timing pulse T4 to the delay circuit D56 to reset the Z register 14.

The left or right read out gate 730 (Fig. 3) or 862 applies a high level to the read-out circuits of the left or right HSM15 or 16, depending, respectively, on whether the $2^9$ bit C register 28 (Fig. 2) is in reset or set condition.

If the left HSM15 has been selected for read-out by a reset condition of the $2^9$ bit of the C register, as assumed above, the addressed character is read out. Read-out takes place through gates 911 (Fig. 4), opened by the sixth timing pulse T6 from the gate 918, whereby the character is read into the Y register 13 (Fig. 4). If, on the other hand, the right HSM16 (Fig. 3) is in condition for read-out, the character is read out through gates 1032 (Fig. 4), primed by the sixth timing pulse T6 passing through the gate 1031. (An input to the gate 1031 labelled NOT S, is considered "high.") The character from the right HSM16 is read into the Z register 14. Simultaneously therewith, the gates 524 (Fig. 2) are opened by the sixth timing pulse T6 passed through the gate 501. The address stored in the C register 28 is passed through these gates 524 and entered in to the A counter 10. The sixth timing pulse T6, passed by gate 501, also primed the set of gates 534. Gates 534, thus primed, cause the entry of the same address entered in the C register 28 to be entered into the B counter 11. Thus, the A counter 10 and B counter 11 contain the same address which is to be used when reading in the first, not-space, least significant character in the selected left or right HSM15 or 16 (Fig. 3). Note that the search for the least significant non-space character starts from the address corresponding to the location to which the item is to be justified. Also, the sixth timing pulse T6 primes the gate 802 to enter the contents of the selected one of the left or right HSM15 or 16 to the corresponding left or right registers 18 or 19.

The gate 944 (Fig. 4) passes the seventh timing pulse to reset the space-right flip-flop F1008 and the space-left flip-flop F911.

If the character, just read out of the memory, is from the left HSM15 (Fig. 3) and is a space, the space character is stored in the Y register 13 (Fig. 4). The space left SPL lead (Fig. 4) then becomes high in the left symbol recognition circuits 22 i.e., "or" circuits R923 provide a low level NOT SPL output which is inverted by the SPL inverter I–9 to provide the high SPL output. The SPL output primes the gate 938 which passes the eighth timing pulse T8 to set the space-left flip-flop F911. If the character just read out of the HSM were from the right HSM16 (Fig. 3) and is a space, the contents of the Z register 14 (Fig. 4) corresponds to a space character. The SPR lead of the right symbol recognition circuits 23 is correspondingly at a high level and the gate 1057 (Fig. 4) is primed. The eighth timing pulse T8 passes through the primed gate 1057 to set the space-right flip-flop F1008. If an ISS (an item separator symbol) is read out, the status transition gate 1211 selects the status level IC to be high and the instruction is complete.

If, on the other hand, the character read from either the left or right HSM15 or 16 is not an item separator symbol ISS, then both the NOT ISSL (Fig. 4) and the NOT ISSR leads of the left and right symbol recognition circuits 22 and 23 are at a high level. In this latter case, the status transition gate 1246 (Fig. 5) passes the eighth delayed timing pulse **T8*a* through the amplifier A1288 and the delay circuit D1288 to set the RIS flip-flop F1288**. The RIS status level is now selected and the RIS lead is high.

In normal operation, since the item being justified is in the left HSM15 or the right HSM16, it will have been read out only to either the Y register 13 or Z register 14. Therefore, one or the other of these registers will remain in reset condition and the output on its corresponding item separator recognition gate will be low. Thus, with both the left and right symbol recognition circuits 22 and 23 recognizing NOT ISSL and NOT ISSR, status level IC cannot be selected.

Note that if the character read out is a space, either the space-left flip-flop F911 (Fig. 4) or the space-right flip-flop F1008 is in the set condition. On the other hand, if no space has been read out, then both of these flip-flops, the space-left F911 and the space-right F1008, are in the reset condition. In either event, the output NOT ISS of one or the other of the item separator symbol recognition gates R922 or R1054 (Fig. 4) will always be high. Therefore, for status transition gate 1246 (Fig. 5) to be able to sense the lack of an item separator symbol in the item being operated upon, both of the (NOT ISS) inputs are required to be high.

3.2.2. *Status level RIS high*

Either the gate 697 (Fig. 2) passes the first timing pulse T1 to open the gates 650 and address the left HSM15 (Fig. 3) with the C counter 12 (Fig. 2); or the gate 695 passes the first timing pulse T1 to open the gates 660 and address the right HSM16 (Fig. 3), with the contents of the C counter 12 (Fig. 2), according to whether the $2^9$ bit of the flip-flop of the C register 28 is in the reset or set condition.

The gate 302 (Fig. 2) passes the second timing pulse T2 to advance the count of the C counter by one. For the purposes of this application, it will be assumed that the C counter 12 is in the forward counting state by reason of a high level being applied to the added input thereof. The C counter 12 now holds the address of the next least significant character of the item after justification.

The left read-in gate 721 (Fig. 3) applies a high level to activate the read-in circuits of the left HSM15 and also to apply a high level to the gate 729. The gate 729 (Fig. 3) passes the fifth timing pulse T5 to enter a space symbol into the left HSM15. The right read-in gate 850 (Fig. 3) applies a high level to activate the read-in circuits of the right HSM16 and also to apply a high level to the gate 858. The gate 858 (Fig. 3), with the occurrence of the fifth timing pulse T5, passes the pulse thus applied to enter a space symbol in the right HSM 16. Recall that the $2^0$ to $2^5$ bits are entered from the left or right registers 18 or 19, which were cleared during the proceeding RO or RS status level. If the $2^9$ bit flip-flop of the C register 28 is set, the space is written into the right HSM16 at the address of the C counter 12 and at the 0 address in the left HSM15. If the $2^9$ bit flip-flop of the C register 28 is in the reset condition, the space is written into the left HSM15 at the address of the C counter 12 and at the 0 address in the right HSM16. Note that this selection as to the left or right HSM's is the same as that described in the preceding section and is controlled by gates 695 and 697 of Figure 2. Note also that the selection as to the left or right read-in gates 721 or 850 (Fig. 3), respectively, is determined by the $2^9$ bit flip-flop of the C register. If set, the right read-in gate 850 (Fig. 3) is activated; if reset, the left read-in gate 721 is activated.

If a space is recognized in the status level RIS, the status transition gate 1235 (Fig. 5) passes the eighth delayed timing pulse T8*a* to the set RS lead, thereby settling the RS flip-flop F1285. Accordingly, the status level RS is again selected to be high.

If further spaces are read out of the HSM15, 16, the operation is as just described with successive cycles of status level RS high and of status level RIS high. Note that the spaces between non-space characters are thus suppressed.

On the other hand, if in the preceding RS cycle, a space was not read out from the left or right HSM15, 16 both the NOT SPL lead (Fig. 4) and the NOT SPR lead (Fig. 4) are high. The status transition gate 1258 (Fig. 5) then passes the eighth delayed timing pulse T8*a* to select the status level RI to be high. Note here again that, as in the case of the NOT ISS inputs during TP8*a* in the RS status level, the Y or Z register 13 or 14 (Fig. 4), respectively, which does not receive a character will cause its corresponding NOT SP recognition gate output to be high. One NOT SP input to the status transition gate 1258 is always high. Therefore, in order to distinguish an actual "NOT SP" character, it is necessary that both NOT SP levels be high when applied to the status transition gate 1258 (Fig. 5), to select the status level RI.

3.2.3 *RS–RIS Sequence*

The RS–RIS sequence is continued until, during the high status level RS, a NOT SP character has been read out of the left HSM15 and stored in the Y register 13 and also in the L register 18. In this event, instead of returning to the status levels RS high after the status level RIS is high, the computer selects the status level RI to be high, and the NOT SP character is read from the L register 18 (for example) to the left HSM15 at the address of the least significant character of the item. Up to this point, the RS–RIS sequence had repetitively, beginning with the address of the least significant character of the item, read out these successive characters, tested each for spaces and item separator symbols, and finding none, returned a space to that character address location. In effect, the intelligence contained in a given item remains unchanged for the duration of the RS–RIS sequence. An exception may be noted in that the last RIS status level replaces a recognized significant character by a space.

3.2.4 *Status level RI high*

Returning now to the sequence of operation which may be observed by reference to the flow diagram of Figure 6, the RI status level has been selected as a result of a NOT SP character having been detected. The first NOT SP character is now to be written in the location of the least significant digit of the item. The left HSM15 (Fig. 3) is addressed by the contents of the A counter 10 (Fig. 2) through the gates 640, opened by the first timing pulse T1, passed through the gate 639. The contents of the B counter 11 pass through the gates 670, opened by the first timing pulse T1 from the gate 690. Note here that the address corresponds to that of the least significant character of the item stored when the justify-right operation began. The C counter 12 is not utilized to address the HSM's during the RI cycle, as occurred during the RS and RIS status levels.

The gate 506 (Fig. 2) passes the second timing pulse T2 to advance the count of the A counter 10 by one. Simultaneously, the gate 507 (Fig. 2) passes the second timing pulse T2 to advance the count of the B counter 11 by one. Either the A counter 10 or the B counter 11 is now prepared to address the HSM15, 16 with the address of the location into which the next character of the item is to be withdrawn.

It should be remembered that at the last status level RS high, the character read out of the memory was stored in either the left or right registers 18 and 19 (Fig. 3). If the $2^{11}$ bit flip-flop of the C register 28 is in its reset condition, the left read-in gate 721 (Fig. 3) primes the gates 799 which pass the fifth timing pulse T5 to open the gates 722. The contents of the left register 18 (Fig. 3) are then written into the left HSM15 at the place addressed by the A counter 10 during the preceding first timing pulse T1. If, on the other hand, but $2^{11}$ bit flip-flop of the C register 28 is in its set condition, the right read-in gate 850 (Fig. 3) primes the gate 899 to pass the fifth timing pulse T5, thereby opening the gates 851. The contents of the right register 18 are then written into the right HSM16 at the place addressed by the B counter 11 (Fig. 2) during the preceding first timing pulse T1.

The eighth delayed timing pulse T8*a* is passed by the RO status transition gate 1268 (Fig. 5). Passage of the eighth delayed timing pulse T8*a* sets the RO status level control flip-flop F1290 and the status level RO is high.

3.2.5 *Status level RO high*

The left HSM15 (Fig. 3) is addressed by the C counter 12 (Fig. 2) through the gates 650. The first timing pulse T1 passes through the gate 697 to open gates 650. Similarly, the right HSM16 (Fig. 3) is addressed by the contents of the C counter 12 (Fig. 2) through the gates 660 (Fig. 2) which are, in turn, opened by the first timing pulse T1 from the gate 695. Criteria here again for selecting either the gate 695 or the gate 697 is the condition of the 29 bit flip-flop of the C register 28. If the $2^9$ bit is reset, the gate 697 is primed; alternatively, if the $2^9$ bit is set, the gate 695 is primed and the address information from the C counter 12 is passed to the right HSM16 (Fig. 3).

The L and R registers 18 and 19 (Fig. 3) are reset by the first timing pulse T1 which passes through the gate 861 (Fig. 3).

If the left HSM15 (Fig. 3) is activated for read-out, the contents of the left HSM15 at the address supplied from the C counter 12, at the last occurrence of the first timing pulse T1, are read into the Y register 13 (Fig. 4) through the gates 911. The gates 911 are opened by the sixth timing pulse T6 which is passed through the gate 919. If the right HSM16 (Fig. 3) is activated for read-out, the contents of the right HSM16 at the address supplied by the C counter 12 (Fig. 2) at the last occurrence of the first timing pulse T1 are read into the Z register 14 (Fig. 4) through the gates 1032. Gates 1032 are opened by the sixth timing pulse T6 which passes through gate 1030. In either event, whether the left or the right HSM15, 16 is activated for read-out the character being read out, passes through the gates 802 (Fig. 3). These latter gates 802 are opened upon the occurrence of the sixth timing pulse T6 which is passed through the gate R register 19, both of Fig. 3.

If the character is not an item separator symbol, then both the NOT ISSL and NOT ISSR leads (Fig. 4) are high as a result of the right and left symbol recognition circuit 22 and 23 failing to recognize an item separator symbol. In the presence of NOT ISSL and NOT ISSR, the status transition gate 1246 (Fig. 5) passes the eighth delayed timing pulse T8*a* to the set RIS lead. Accordingly, after being reset through amplifier 1299, the status level control flip-flop 1288 is set and the status level RIS is now high.

3.2.6 *RIS–RI–RO sequence*

Another sequence of status levels that may be observed in Figure 6 has not been discussed above. The sequence is the RIS–RI–RO sequence. The RIS–RI–RO sequence is repeated upon the addresses of successive characters of the item being justified to the right, starting with the address of the first NOT SP, NOT ISS character recognized. During each sequence, the successive characters are read into the HSM15 or 16 at an address beginning with that of the least significant character of the item. The importance of this sequence and of the mechanization herein described is that it permits a right hand justification of variable length items with no prior knowledge of either the actual permissible item length, the actual number of non-space characters, or the positions of these characters within the item length. This permits operation upon items of maximum length, limited only by the total memory capacity while at the same time taking an amount of time proportional to the item under consideration. It is to be further noted that the status levels and time pulses exactly described are not essential to the mechanism herein described. Thus, by way of example, if a more limited operation is desirable, the status level RO may be combined with the status level RS and either one or the other eliminated.

3.2.7 *Effect of ISS*

During the eighth delayed timing pulse T8*a*, a decision, as indicated in Figure 6, is made as to whether to go to status level IC, thereby ending the justify-right operation, or continuing the RIS–RI–RO sequence. This decision is dependent upon the presence or absence of an item separator symbol. If, as stated above, a NOT ISS is recognized in either the Y or Z registers, 13 or 14 (Fig. 4) respectively, the left and right symbol recognition circuits 22 and 23 are energized. In the presence of the NOT ISSL, NOT ISSR, recognition status transition gate 1246 selects status level RIS. If, on the other hand, an ISS has been recognized in either the Y or the Z registers, 13 and 14 respectively (Fig. 4), status transition gate 1211 selects status level IC and the operation justify-right is at an end. Note here, in contradistinction to that of the RIS and RI status transition gates 1246 and 1258, either an ISSL or an ISSR is sufficient to select the IC status level. The alternative criteria is allowable in this case due to the fact that no ISS ever appears in either the Y or the Z register unless and until such symbol is introduced therein from the HSM, at which time the justify-right operation may properly come to a close.

3.2.8 *Illustrative sequence of status levels*

The following example represents an item having an item separator symbol (.) and numeric characters C2, C3, C1 stored in the HSM15, 16 in the addresses numbered 301 to 308 inclusive as follows:

*Example for justify right—operation E—before justifying*

| 308 | 307 | 306 | 305 | 304 | 303 | 302 | 301 |
|---|---|---|---|---|---|---|---|
| . | $C_3$ | $C_2$ | $C_1$ | — | — | — | —. |

In this example, the not-space characters $C_3$, $C_2$, $C_1$ are to be moved to the right to the addresses 303, 302, and 301 as follows:

*Example for justify right—operation E—after justifying*

| 308 | 307 | 306 | 305 | 304 | 303 | 302 | 301 |
|---|---|---|---|---|---|---|---|
| . | — | — | — | — | $C_3$ | $C_2$ | $C_1$ |

The "C" section of the instruction (refer to section 3.1 above), which is stored in the C register 28 (Fig. 2), uses address of the HSM15, 16 where the least significant digit of the item is to be found. The sections for the A register 26 and the B counter 11 are not used, as was described in paragraph 3.2 above.

Assume, for this example, that the item is to be stored in the left HSM15 (Fig. 3). This fact is indicated by the $2^9$ bit (10th bit) of the address inserted into the C register, being a "zero." If the item is to be stored in the right HSM16, the $2^9$ bit is "one." However, for the sake of brevity, the following description is based upon the assumption that the item is stored in the left HSM15 and that the $2^9$ bit of the address, which is stored in the C register 28, is zero. The corresponding operation for the selection of the right HSM16 should be clear from the detailed description already given.

Referring to the status level flow diagram for the operation justify-right (E) of Fig. 6, the instruction is staticized in the usual way by the status level sequence R001, R002, R003. The address of the least significant character of the item to be justified is stored in the C register 28 and in the C counter 12. Status level RS is selected and the characters are now read out, starting with the least significant character, from the space 301 into the L and R registers 18 and 19 (Fig. 3). With the selection of the next succeeding status level RIS, a space character is read back into the location from which each character during RS has been read out. Thus, the characters are read out in the status level RS (read out and search) and a space is read back in during the high status level RIS (read in space). These status levels are alternately high, in sequence, as long as a space symbol is recognized during each RS status level. Note that, the first time the status level RIS is high, the address of the least significant character of the item at which the first not-space (i.e. non-space) character is to be transferred is entered into the A counter 10. In other words, the least significant character address in the example above, No. 301, the space initially addressed, and to which the item is to be justified to the right, is stored in the A counter 10.

During each RIS status level, the C counter 12, which is utilized to address the memory read out and each space read-in, is advanced by a count of one to the next succeeding character address of the item being justified to the right. This RS–RIS sequence is continued until, during the high status level RS, a not-space character is read out of the left HSM15 and stored in the Y register 13 (Fig. 4) and also in the L register 18 (Fig. 3). In this event, the recognition circuits 22 (Fig. 4) establish the criteria necessary for the selection of status level RI. With the selection of the status level RI, this first not-space character, in the example given C1, at the address 305, is read from the L register 18 into the left HSM, at the address 301 of the least significant character of the item. This least significant character address 301 has been stored in the A counter 10, as mentioned above. Immediately after addressing the left HSM15, this address, stored in the A counter 10, is advanced by one to the next most significant digit of the item being justified.

Having completed the RI status level, the next status level RO, as seen in Fig. 6, is selected. During the high status level RO, the next not-space character C2 (whose address 306 is stored in the C counter 12) (Fig. 2) is read out of the left HSM15 (Fig. 3) to the Y register 13 (Fig. 4). Following the RO high status level, during which the not-space character C2 was read from the left HSM15, the left symbol recognition circuits 22 (Fig. 4) recognizes a NOT ISS symbol. With this recognition criteria, along with that from the right recognition circuits 22 which must also recognize NOT ISS, the status level RIS is now selected. As before, during the RIS status level, a space is read into the left HSM15 at the address 306. The C counter 12 is triggered to advance the address to 307. Status level is changed to RI upon the recognition of a not-space character by the left symbol recognition circuits 22, and the second not-space character C2 is now read into the left HSM15, during the RI' status level, at the address 302 established by the A counter 10, from the L register 18. The A counter is again advanced by one to now store the address 303 at which the next most significant character, if any, is to be stored. It should be noted at this point that the not-space characters C1 and C2 have been shifted to the right. The remaining characters of the item have been replaced by space symbols, with the exception of the item separator symbol and the last not-space character C3 stored at addresses 308 and 307, respectively. The C counter 12 is now set for the address 307 and the A counter 10 is set for the address 303.

The RO–RIS–RI sequence is repeated until an item separator symbol is recognized at the address 308 during the high status level RO. Such recognition indicates that all the characters of the item have now been shifted and that the justify-right instruction has been completed. The IC (instruction complete) status level is then selected. The next program instruction may now be set up to perform some other machine operation, as is more fully described in the Bensky application, Serial No. 478,021, filed December 28, 1954.

Note that an item separator symbol may also be recognized during any RS status level high at which time the status level IC is immediately selected, and the operation justify-right brought to a close. The recognition of an item separator symbol during the RS status level indicates that no not-space characters were in the item being justified, and the item has remained unchanged, storing all spaces. Note further that, in the present machine, if a space is encountered following a not-space, the space between a not-space character is obliterated. Therefore, this instruction is reserved for numbers and other items without spaces between not-space characters.

By way of overall summary of the justify-right operation, the operation is staticized during the status levels R001, R002, and R003. The characters of the item beginning with the least significant digit are individually examined to determine their nature. The C counter 12 maintains the successive addresses of the characters undergoing examination. Whenever a not-space character is recognized during this examination, this character is immediately read to the address of the least significant character of the item, which address is maintained by the A counter 10. Successive not-space characters are entered in successive addresses adjacent that of the least significant character. At any time, whenever the item separator symbol is recognized during the examination the operation is ended.

4.0 *Conclusion*

There has been hereinabove described a superior means and method of justifying the characters of an item stored in the memory of an information handling system in a short amount of time. The method and system, according to the invention, permit justification of variable length items with no prior knowledge of either the maximum permissible item length, the actual number of not-space characters, or the position of these characters within the assigned item length. Thus, the maximum length of the items is limited only by the memory capacity. Further, the memory location at which the justified-right item is placed is independent of the original location of the item. The mechanization described may be employed with any type of static or random access memory.

What is claimed is:

1. In a system having a memory of ordered addresses at successive addresses of which may be stored an item comprising a sequence of two kinds of characters represented by signals, means for justifying the said characters of one of said items comprising means for reading out from said memory successively each of said characters of said one item starting with a first character thereof, means for replacing each said character as read out with a character of one of said kinds, means for recognizing as said character is read out whether said character read out is of said one kind or said other kind, and means for sequentially storing at each successive address beginning with said first address characters of those thus read out only of said other kind, each being stored before the next succeeding character is thus withdrawn.

2. In a system having a memory of ordered addresses at successive addresses of which may be stored an item comprising a sequence of two kinds of characters represented by signals, means for justifying the said characters of one of said items comprising means for withdrawing from said memory successively each of said characters of said one item starting at a first location corresponding to a first character thereof, means for counting each of said characters withdrawn by said withdrawing means and for storing space characters at storage locations corresponding to this count, means for recognizing non-space ones of said withdrawn characters, means for counting each of these recognitions, and means for storing each of said non-space characters at storage locations starting at said first location corresponding to the recognition count before the next character is so withdrawn, whereby said item is justified to the right.

3. A system comprising a memory capable of storing electrical signals representing characters, means to withdraw successively from said memory and to examine each of said characters as to whether each is of one kind or another kind, and means responsive to said examining means to store each of said characters of said one kind at successive storage locations in said memory before the withdrawal of the next successive character.

4. In combination with a system having a memory capable of storing characters represented by electrical signals at storing addresses therein, a system for providing right hand justification of said characters stored in said memory comprising means to successively withdraw and examine each of said characters as to whether each is of one kind or of another kind, and means responsive to each of said examinations to store a character of said another kind in each of said examined character storage addresses before the withdrawal of the next successive character for examination.

5. In combination with a computing system having a memory capable of storing characters at storage addresses thereof, a system for providing right hand justification of said characters comprising means to successively examine at successive ones of said addresses each of said characters therein as to whether each is of one kind or of another kind, means responsive to the absence of characters of said one kind to replace each of said examined characters by a character of said another kind.

6. That system claimed in claim 5 wherein said responsive means includes counters.

7. A system for providing right hand justification of characters and including a memory capable of storing variable character length items at storage addresses thereof, said characters being of space and non-space types, said system including a first means to successively address said addresses, a second means to successively address said addresses, means responsive to said first addressing means to withdraw successively said characters one by one from said memory, means to recognize said space characters if one is withdrawn, and means responsive to said second addressing means and to the recognition of only space characters by said space character recognition means to store said space characters in said memory.

8. In combination with an information handling system having a memory capable of storing variable character length items at storage addresses thereof, said characters being of space and non-space kinds, the improvement comprising means for providing right hand justification of said items, said justification means comprising a first means to successively address said memory, a second means to successively address said memory, means responsive to said first addressing means to successively withdraw said characters from said memory beginning at an address with the least significant one of said characters, means to recognize said space characters, and means responsive to said second addressing means and to the recognition of only space characters by said space character recognition means to store only said space characters and not said non-space characters in said memory.

9. In combination with an information handling system having a memory capable of storing items having a variable number of characters at storage addresses thereof, said characters being represented by electrical signals, a system for providing right hand justification of the items, said system comprising a first means for storing first address for addressing said memory, a second means for storing a second address for addressing said memory, means responsive to said first addressing means to withdraw a character from said memory at the said first stored address, said first addressing means being responsive to each of said character withdrawals to advance the said first stored address to the next succeeding address, means to recognize said characters on withdrawal as to whether each is a space or a non-space character and means responsive to the recognition by said recognition means of a non-space character and to said second addressing means to store said non-space characters in said memory.

10. In combination with an information handling system having a memory capable of storing characters at storage addresses thereof, a system for providing right hand justification of the characters of an item which may have a different number of characters, said system comprising a first means including a first counter for containing a count as a first address for addressing said memory, a second means including a second counter for containing a count as a second address for addressing said memory, means responsive to said first addressing means to withdraw a character from said memory at said first address, said first addressing means being responsive to each of said character withdrawals to advance the said first counter count to the next succeeding count, means to recognize a non-space character in said characters, and means responsive to said second addressing means and to recognition of a non-space character by said recognition means to store said recognized non-space character at said second address in said memory.

11. In combination with an information handling system having a memory capable of storing characters at storage addresses thereof, said characters being represented by electrical signals, a system for providing right hand justification of a group of said characters stored at successive memory addresses, comprising a first means including a first counter to address said memory a first address corresponding to the count therein, a second means including a second counter to address said memory at a second address corresponding to the count in said second counter, means responsive to said first addressing means to withdraw a character from said memory at the said first address, said first addressing means being responsive to each such withdrawal to advance the said first address to the next succeeding address, means to recognize a non-space character among said characters, and means responsive to said second addressing means and to recognition means of a non-space character to store said last-mentioned non-space character in said memory and to advance the count of said second counter, whereby there may be stored at successive addresses beginning with the least significant address of said characters of said group.

12. In combination with an information handling system having a memory capable of storing characters at different addresses thereof, a system to provide right hand justification of an item made up of a group of said characters including means including a first address counter to successively read out said characters included in one of said items, said first counter being advanced in response to each character read out, recognition means to recognize a non-space character in said read out characters, a second address counter, said second counter being responsive to the output of said recognition means to advance on each recognition of a non-space character by said recognition means, and means to read into said memory said non-space characters at an address determined by said second counter.

13. In combination with an information handling system having a memory capable of storing characters at storage addresses thereof, a system to provide right hand justification of the non-space characters including means including a first address counter to successively read out said characters, said first counter being advanced in response to each character read out, means to recognize a non-space character in said read out characters, a second address counter, means to read space characters into said memory at addresses determined by said first counter, said second counter being responsive to the output of said recognition means, to advance on each recognition thereby of a non-space character, and means to read into said memory said non-space characters at an address determined by said second counter.

14. In combination with an information handling system having a memory capable of storing characters at storage addresses thereof, a system to provide right hand justification of a group of characters thus stored including means to successively read out the characters making up said items, means to recognize a non-space character in said read out characters, means responsive prior to the recognition of a non-space character in said group to read a space character into said memory at each of said successive address from which a space character is withdrawn, and means responsive subsequent to the recognition of a non-space character in said group to read said non-space characters into successive preselected memory locations.

15. In combination with an information handling system having a memory capable of storing characters at storage addresses thereof, a system to provide right hand justification of an item formed of a group of successive characters thus stored including means to successively read out said characters, means to recognize a non-space character in said read out characters, means responsive prior to the recognition of a non-space character in said group to read space characters into said memory at successive addresses, and means responsive subsequent to the recognition of a non-space character in said group to read said non-space characters into successive preselected memory addresses, said means for reading space characters into said memory being effective to continue to read space characters in a continued sequence into said successive memory locations.

16. In combination with an information handling system having a memory capable of storing characters at storage addresses thereof, said characters being represented by electrical signals, a system to provide right hand justification of an item formed of a group of said characters, said system comprising means including a first address counter to successively read out said characters, said characters being of one kind and another kind, means to recognize said one kind of character in said read out characters, means responsive to said first address counter and to the recognition of said one kind of characters to read said one kind of characters into said memory at successive ones of said addresses starting with a first address, a second address counter, means responsive to said second address counter and to the recognition of said other kind of characters to read said other kind of characters into successive preselected memory addresses starting with said first, said means responsive to said first counter being further responsive to the recognition of said other kind of characters to continue to read said one kind of characters successively into successive memory locations.

17. In an information handling system having one or more characters represented by coded electrical signals, said system including a means to generate repreated cycles of timing pulses, the combination with a memory of a means to provide right hand placement of non-space characters of said characters within a given group memory locations, said means comprising two counters, said counters being adapted to control the memory locations of said characters, two registers, means to selectively read out said characters from said memory location under control of one of said counters into said registers, a number, said number being a digit greater than one, of recognition gates each connected to the output of a single one of said registers, each of said recognition gates being responsive to said characters read into said one register, and a like number of bistable means corresponding respectively to said gates and connected to the outputs of said recognition gates, each of said bistable means being responsive to recognition by the corresponding recognition gate of a particular non-space character of said characters and to said timing pulses to assume one of its stable states, one of said counters being responsive to one stable state of said bistable means and to said timing pulses to advance its count each time a character is read out of said memory, the other one of said counters being operable to advance its count each time a non-space character is read from said memory, said other counter being adapted to control the read in memory location of said non-space characters.

18. In an information handling system comprising a random access memory having addressing means, a system for changing the relative positions of successive electrically coded characters with respect to the first or last one of a given series of said characters, said system comprising a first counter and a second counter, said counters being operative to store memory addresses of said characters, means to successively extract characters from or insert characters into said memory locations stored by said counters, means to temporarily store said characters, means to reinsert said temporarily stored characters into said memory in an address determined by said counters, detecting means responsive to character signals applied thereto, means to apply said extracted characters to said detecting means to obtain a detection signal, and means to generate varied signals in response to said detection signals, said varied signals being of one kind for space signals and of another kind for non-space signals applied to said detecting means, said first counter being responsive to said varied signals to advance the character address therein by one for each successive character extracted from said memory, said second counter being responsive to non-space characters of said varied signals to advance the said character address by one for each successive non-space character extracted from said memory, whereby non-space characters may be shifted in their relative positions with respect to each other.

References Cited in the file of this patent

UNITED STATES PATENTS

| | | |
|---|---|---|
| 2,714,843 | Hooven | Aug. 9, 1955 |
| 2,770,797 | Hamilton | Nov. 13, 1956 |